(12) United States Patent
Lee et al.

(10) Patent No.: US 9,882,337 B2
(45) Date of Patent: Jan. 30, 2018

(54) METHOD FOR MANUFACTURING LASER MODULE, AND LASER MODULE PACKAGE

(71) Applicant: KOREA ELECTRONICS TECHNOLOGY INSTITUTE, Seongnam-si, Gyeonggi-do (KR)

(72) Inventors: Hyung Man Lee, Seongnam-si (KR); Soon Seob Park, Pyeongtaek-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 15/109,090

(22) PCT Filed: Feb. 11, 2015

(86) PCT No.: PCT/KR2015/001393
§ 371 (c)(1),
(2) Date: Jun. 29, 2016

(87) PCT Pub. No.: WO2015/174614
PCT Pub. Date: Nov. 19, 2015

(65) Prior Publication Data
US 2016/0329676 A1    Nov. 10, 2016

(30) Foreign Application Priority Data

May 16, 2014    (KR) .................. 10-2014-0058983

(51) Int. Cl.
*H01S 3/08* (2006.01)
*H01S 3/11* (2006.01)
(Continued)

(52) U.S. Cl.
CPC ............ *H01S 3/025* (2013.01); *H01S 3/0941* (2013.01); *H01S 3/094003* (2013.01);
(Continued)

(58) Field of Classification Search
CPC .............. H01S 3/025; H01S 3/094003; H01S 3/094038; H01S 3/0941; H01S 3/061; H01S 3/09415; H01S 3/0092; G02B 7/18
See application file for complete search history.

(56) References Cited

U.S. PATENT DOCUMENTS 5,144,630 A    9/1992 Lin
5,742,626 A    4/1998 Mead et al.
(Continued)

FOREIGN PATENT DOCUMENTS

KR    20040016542 A    2/2004
WO    0068721 A    11/2000
WO    2007064298 A1    6/2007

OTHER PUBLICATIONS

International Search Report for PCT/KR2015/001393 dated Jun. 12, 2015.

*Primary Examiner* — Yuanda Zhang
(74) *Attorney, Agent, or Firm* — Hauptman Ham, LLP

(57) ABSTRACT

The present invention relates to a method for manufacturing a laser module, and a laser module package, and the method for manufacturing a laser module. Rapidity, accuracy and high reliability of the manufactured module can be obtained by aligning precisely using an automated equipment, and fixing components through laser welding.

4 Claims, 22 Drawing Sheets

(51) Int. Cl.
*H01S 3/02* (2006.01)
*H01S 3/094* (2006.01)
*H01S 3/0941* (2006.01)
*G02B 7/18* (2006.01)
*H01S 3/00* (2006.01)
*H01S 3/06* (2006.01)

(52) U.S. Cl.
CPC .......... *H01S 3/094038* (2013.01); *G02B 7/18* (2013.01); *H01S 3/0092* (2013.01); *H01S 3/061* (2013.01); *H01S 3/09415* (2013.01)

(56) References Cited

U.S. PATENT DOCUMENTS

| | | | |
|---|---|---|---|
| 5,835,513 | A | 11/1998 | Pieterse et al. |
| 6,002,697 | A * | 12/1999 | Govorkov ............ G02F 1/3501 372/22 |
| 6,115,402 | A | 9/2000 | Caprara |
| 2005/0135751 | A1 | 6/2005 | Zbinden |
| 2005/0152426 | A1 * | 7/2005 | Dell'Acqua .......... H01S 3/0941 372/69 |
| 2008/0298402 | A1 * | 12/2008 | Rossi .................. H01S 5/02248 372/20 |
| 2009/0285256 | A1 * | 11/2009 | Adamkiewicz ......... H01S 3/025 372/107 |
| 2011/0158267 | A1 | 6/2011 | Tsai |

\* cited by examiner

METHOD FOR MANUFACTURING LASER MODULE, AND LASER MODULE PACKAGE

CROSS REFERENCE TO RELATED APPLICATIONS

This application claims the priority of Korean Patent Application No. 10-2014-0058983 filed on May 16, 2014 in the Korean Intellectual Property Office. Further, this application is the National Phase application of International Application No. PCT/KR2015/001393 filed on Feb. 11, 2015, which is incorporated herein by reference in its entirety.

TECHNICAL FIELD

The present invention relates to a method for manufacturing a laser module, and a laser module package for aligning and fixing the elements of the module in order to enhance the efficiency and the stability thereof, and miniaturize them.

BACKGROUND ART

Laser module is an important product which is applied to the various industrial fields such as semiconductor, display, automobile, defense, medical instrument, and the like. Laser module is named differently depending on the material being used, and the most widely used product is the semiconductor diode pumping laser module based on a solid state crystal. Oscillation of a specific wavelength according to the absorption and the energy transition becomes possible by illuminating the crystal such as Nd:YAG crystal with a high power semiconductor pumping diode or a flash lamp as an excitation source. In this way, by configuring a resonator having a solid state crystal wherein a pumping light source is used as an excitation source, a laser having a desired wavelength can be oscillated, and a laser module having a desired energy can be manufactured. Besides, a pulse laser can be manufactured by configuring with a Q-switching module inside the resonator. If a wavelength conversion technology is applied using a nonlinear optical crystal, laser modules having various wavelengths from infrared to UV can be manufactured. And thus, laser modules having various wavelengths, energies, and pulses can be manufactured, and applied to various application fields.

Meanwhile, a solid state laser module has a monochromatic property, and is often manufactured as a module generating a particular wavelength by combining a second harmonic generator and a third harmonic generator. (Refer to U.S. Pat. Nos. 6,115,402, 5,835,513, 5,742,626, and 5,144,630.)

A solid state laser module generates a fundamental laser light by the input from the pumping light source. Generally, a 1064 nm fundamental laser light is generated by using 808 nm wavelength diode pumping, and a YAG crystal doped with 1.0% Nd, and at this time, the efficiency between 20 to 30% can be obtained. A second harmonic wave and a third harmonic wave can be generated by inputting the fundamental laser light into a wavelength variable crystal like LBO. For example, LBO crystal having cutting angles of $\varphi=0°$ and $\theta=90°$ can be used for generating 532 nm from 1064 nm. In this case, temperature is required to be set around 150° C., and this is referred to as 'non-critical phase matching.' A third harmonic wave of a UV wavelength can be generated by inputting 1064 nm and 532 nm wavelength lights into a wavelength variable crystal like LBO. For example, LBO crystal having cutting angles of $\theta=42°$ and $\varphi=90°$ can be used. In this case, temperature is required to be set about 40 to 50° C.

The optical elements having the above described features are arranged into an intracavity structure or an extracavity structure, and they are aligned and fixed therein so as to generate a desired wavelength, and such technique can be referred to as the manufacturing technology of a solid state laser module.

Q-switching is a technology used for manufacturing a pulsed light having a narrow line width among the solid state laser module manufacturing technologies. Generally, the Q-switching technologies are classified into: A-O Q-switching and E-O Q-switching; or an active Q-switching using a mechanical type Q-switching and the like, and a passive Q-switching adopting a saturable absorption method wherein a crystal such as Cr:YAG crystal is used. Q-switching elements are provided inside the resonator for generating a fundamental laser light having a pulse width less than a nanosecond.

According to the laser module manufacturing method of the prior art, components are disposed on the designed optical path, and after manually aligning the components one by one, the optical components are fixed thereto by using fastening means like screws, and thus, there are problems in that the efficiency and the stability of the laser module are being degraded.

SUMMARY OF INVENTION

Technical Problem

An objective of the present invention, devised to solve above described problems, is to provide a method for manufacturing laser module, and a laser module package, wherein optimization of optical elements requiring precise alignment is possible, and an enhancement in efficiency is possibly anticipated.

Solution to Problem

A method for manufacturing a laser module comprises the steps of: (a) attaching optical elements to a mount jig; (b) fixing the mount jig to an optical alignment system; (c) arranging the mount jig fixed to the optical alignment system on an upper side of a base member; (d) aligning the optical elements by using the optical alignment system; (e) letting the mount jig be in close contact with the base member; (f) performing laser welding so that the base member is fixed to the mount jig; and (g) removing the optical alignment system.

In the present invention, if let the direction of light propagation be the axis 1, and let the linear axes orthogonal to each other be axis 1, axis 2, and axis 3, and let the rotation axes of the linear axes be axis 1R, axis 2R, and axis 3R respectively, then the alignment of the axis 1R had already been completed when the optical element was attached to the mount jig in step (a), and thus, it is characterized in that the optical alignment system is a 3-axis alignment system for aligning 3 axes of axis 1, axis 2, and axis 3R.

In the present invention, if let the direction of light propagation be the axis 1, and let the linear axes orthogonal to each other be axis 1, axis 2, and axis 3, and let the rotation axes of the linear axes be axis 1R, axis 2R, and axis 3R respectively, then the alignment of the axis 1R had already been completed when the optical element was attached to the mount jig in step (a), and thus, it is characterized in that the optical alignment system is a 5-axis alignment system for aligning 5 axes of axis 1, axis 2, axis 3, axis 2R, and axis 3R.

In the present invention, it is characterized in that in step (e), a welding jig is disposed between the mount jig and the base member, and the mount jig, the welding jig, and the base member are forced to be in close contact with one another, and in step (f), laser welding is performed in a way that the welding jig is fixed to the mount jig and the base member.

Meanwhile, a laser module package according to the present invention is characterized in that and includes: a pumping source for generating a pumping light and outputting thereof; and a resonator comprising an input reflecting unit, an optical crystal, a Q-switching device, an aperture, an output reflecting unit, for receiving the light from the pumping source and outputting the light with a maximized power, wherein the pumping source, the optical crystal, and the aperture are fixed to a base member, and the input reflecting unit, the Q-switching device, and the output reflecting unit are attached to a mount jig, and then the mount jig is fixed to an optical alignment system and disposed in the upper side of the base member, and then they are aligned by using the optical alignment system, and a welding jig is disposed between the mount jig and the base member so that they are forced to be in close contact with one another, and then the mount jig and the welding jig, and the welding jig and the base member are fixed to each other respectively through laser welding.

In the present invention, it is characterized in that an optical component for receiving and reflecting the light outputted from the resonator; and a wavelength conversion crystal component for converting the wavelength of the light outputted from the optical component are further included.

In the present invention, it is characterized in that the wavelength conversion crystal component includes: a wavelength conversion crystal; a wavelength conversion crystal jig for fixing the wavelength conversion crystal; a temperature control means disposed in one side of the wavelength conversion crystal jig; and a wavelength conversion mount jig provided to cover the wavelength conversion crystal jig and the temperature control means, and provided to be thermally insulated from the wavelength conversion crystal jig, wherein after fixing the wavelength conversion crystal component to an optical alignment system and disposing it in the upper side of a wavelength conversion base member, the wavelength conversion crystal component is aligned by using the optical alignment system, and then a wavelength conversion welding jig is disposed between the wavelength conversion crystal component and the wavelength conversion base member so that they are forced to be in close contact with one another, and then the wavelength conversion mount jig and the wavelength conversion welding jig, and the wavelength conversion welding jig and the wavelength conversion base member are fixed to each other respectively through the laser welding.

Advantageous Effects of Invention

According to a method for manufacturing a laser module, and a laser module package, there are advantageous effects as follows:

Optimization of optical elements requiring precise alignment becomes possible, and an enhancement in the efficiency thereof can be expected.

In addition, the fixing method based on laser welding is more rapid and accurate than the manual coupling (jointing) method, and can achieve high reliability.

Thus, unlike the method of the prior art wherein optical elements requiring multi-axes micro alignment are manually aligned one by one, and being fixed using a fixing means like screws, the present invention can obtain rapidity, accuracy and high reliability of the manufactured module by aligning precisely using an automated equipment, and fixing components through laser welding.

DETAILED DESCRIPTION OF EMBODIMENT

Figure 1:
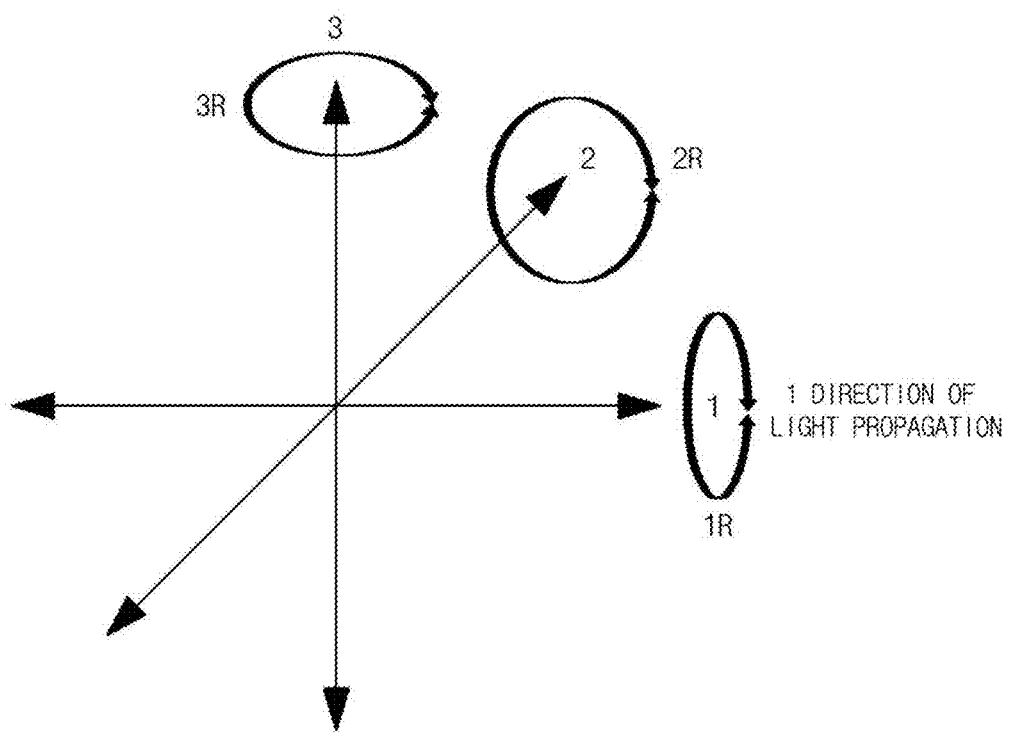
FIG. 1 illustrates the directions of 6 axes for aligning the laser module.

Hereinafter, a preferred exemplary embodiment of the present invention will be described in detail with reference to the accompanying drawings. Prior to this, it should be understood that the terms used in the specification and claims should not be construed as limited to general and dictionary meanings, but should be interpreted as meanings and concepts corresponding to technical aspects of the present invention on the basis of the principle that the inventor may appropriately define the terms in order to describe his or her invention in a best way.

Thus, the exemplary embodiments described herein and the configuration illustrated in the drawings are nothing but the most preferred embodiment of the present invention, and since they are not representing all of the technical spirits of the present invention, it should be understood that various equivalents and modifications that may replace those (preferred embodiments) could be existing at the time of this application.

Alignment and fixing for various optical elements are required in manufacturing laser module. The most precise method among the optical alignment methods is fixing an optical element 10 in an arbitrary space by moving 6 axes, and the directions of the 6 axes can be defined as FIG. 1.

That is, as shown in FIG. 1, if let the direction of light propagation be the axis 1, and let the linear axes orthogonal to each other be axis 1, axis 2, and axis, and let the rotation axes of the linear axes be axis 1R, axis 2R, and axis 3R respectively.

In manufacturing a laser module in the present invention, the alignment of the optical element 10 can be classified into 3 types, that is, a fixed type, a 3-axis alignment, and a 5-axis alignment.

First, in the case of the fixed type, alignment is completed when an optical element is fixed in the assigned location of the base member of the laser module using fixing means such as screws, or through laser welding.

Next, a manufacturing method using 3-axis alignment will be described as follows:

A 3-axis alignment can be applied for aligning and fixing of an optical element 10 not requiring axis 3 and axis 2R, for example, a reflecting mirror and the like.

Figure 2:
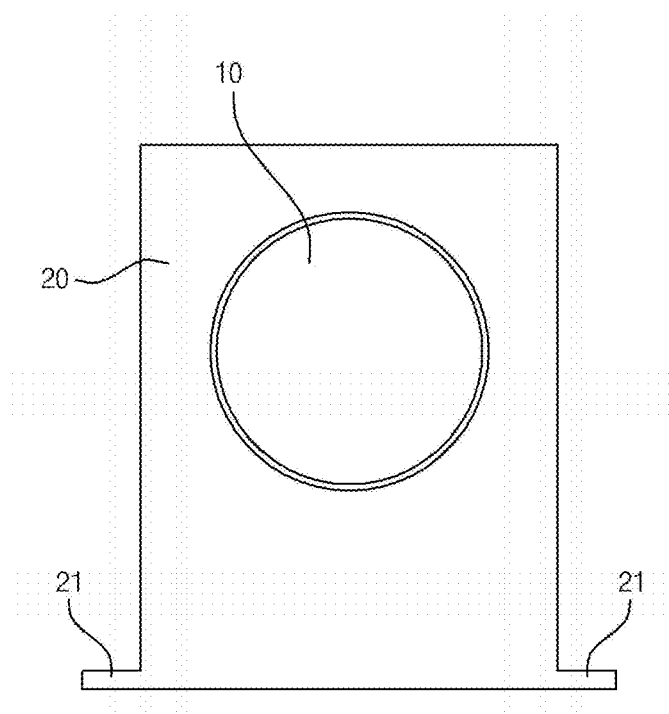
FIGS. 2 to 8 illustrate a method for manufacturing a laser module using 3-axis alignment according to a preferred exemplary embodiment of the present invention.

First, as shown in FIG. 2, the optical element 10 is attached to the mount jig 20; this is step (a).

In the present exemplary embodiment, since the mount jig 20 is directly fixed to the base member 40 covering the optical element 10, preferably, a protruded edge 21 is formed in the lower end portion of the mount jig 20 for the convenience of fixing thereof to the base member 40.

If the optical element 10 is a reflecting mirror, generally it is manufactured using a glass material, and the one surface of the optical mirror 10 is manufactured to have a high reflectivity for a specific wavelength.

The optical element 10 and the mount jig 20 can be fixed using a thermal curing or a UV curing epoxy.

Since the mount jig 20 is to be bonded to the base member 40 through laser welding, it is preferred to use a material having a low expansion coefficient, and any material that can be used for laser welding is acceptable. For example, various materials such as kovar, invar, stainless steel, aluminum (Al) or magnesium (MG) alloy, and the like can be applied.

Figure 3:
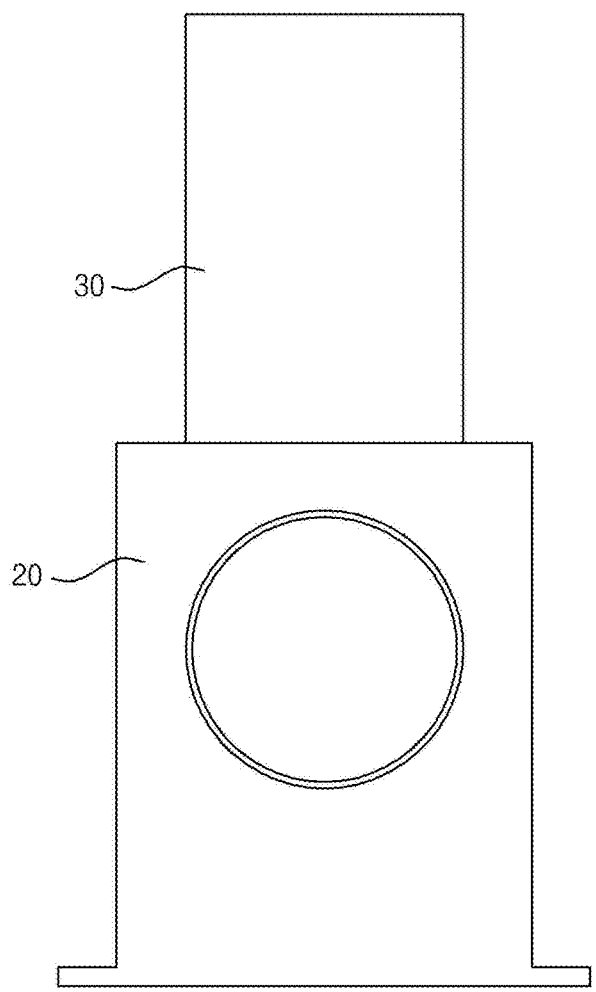

Next, as shown in FIG. 3, the mount jig 20 is fixed to the optical alignment system 30; this is step (b). That is, the optical alignment system 30 is fixed to the upper portion of the mount jig 20 using vacuum suction, pneumatic jig, screw coupling, and the like.

The alignment of the axis 1R had already been completed when the optical elements were attached to the mount jig in step (a), therefore, it is preferred that the optical alignment system 30 in step (b) is a 3-axis alignment system for aligning 3 axes of axis 1, axis 2, and axis 3R.

The 3-axis alignment system of the present exemplary embodiment only uses axes to be used for aligning in a 5-axis alignment system which will be described later and fixes the remaining axes, thus, of course, 3-axis alignment can be performed in the 5-axis alignment system as well.

The mount jig 20 requires a precise 3-axis optical alignment to adopt the optical element 10 like a reflecting mirror. When applying automatic equipment for this purpose, a 3-axis alignment system comprising a motorized stage can be applied.

Figure 4:
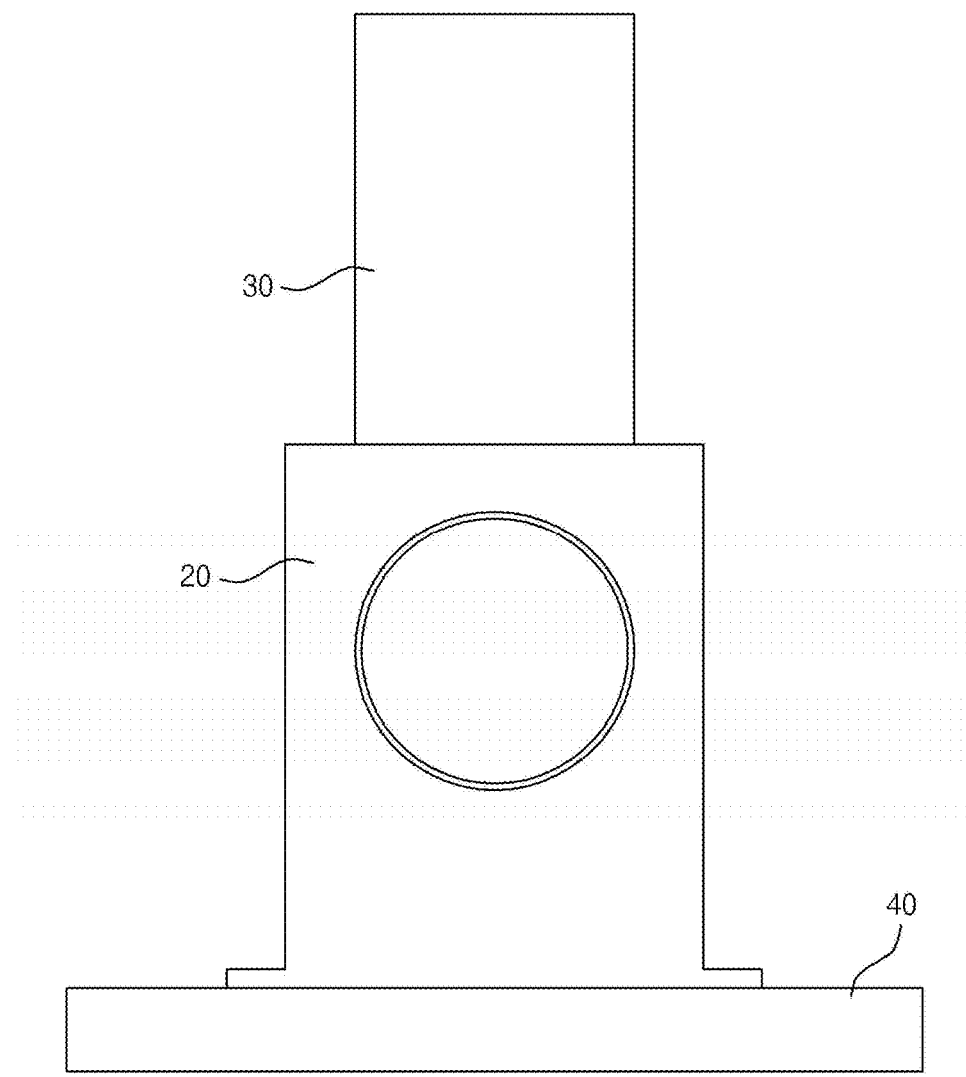

Next, as shown in FIG. 4, a mount jig 20 wherein an optical alignment system 30 is fixed is disposed in the upper side of the base member; this is step (c). That is, the mount jig 20 fixed with the optical alignment system 30 is moved to a specific location of the base member 40 of the laser module. In the present exemplary embodiment, the mount jig 20 is positioned so that the upper surface of the base member 40 is to be in contact with the lower surface of the mount jig 20.

Figure 5:
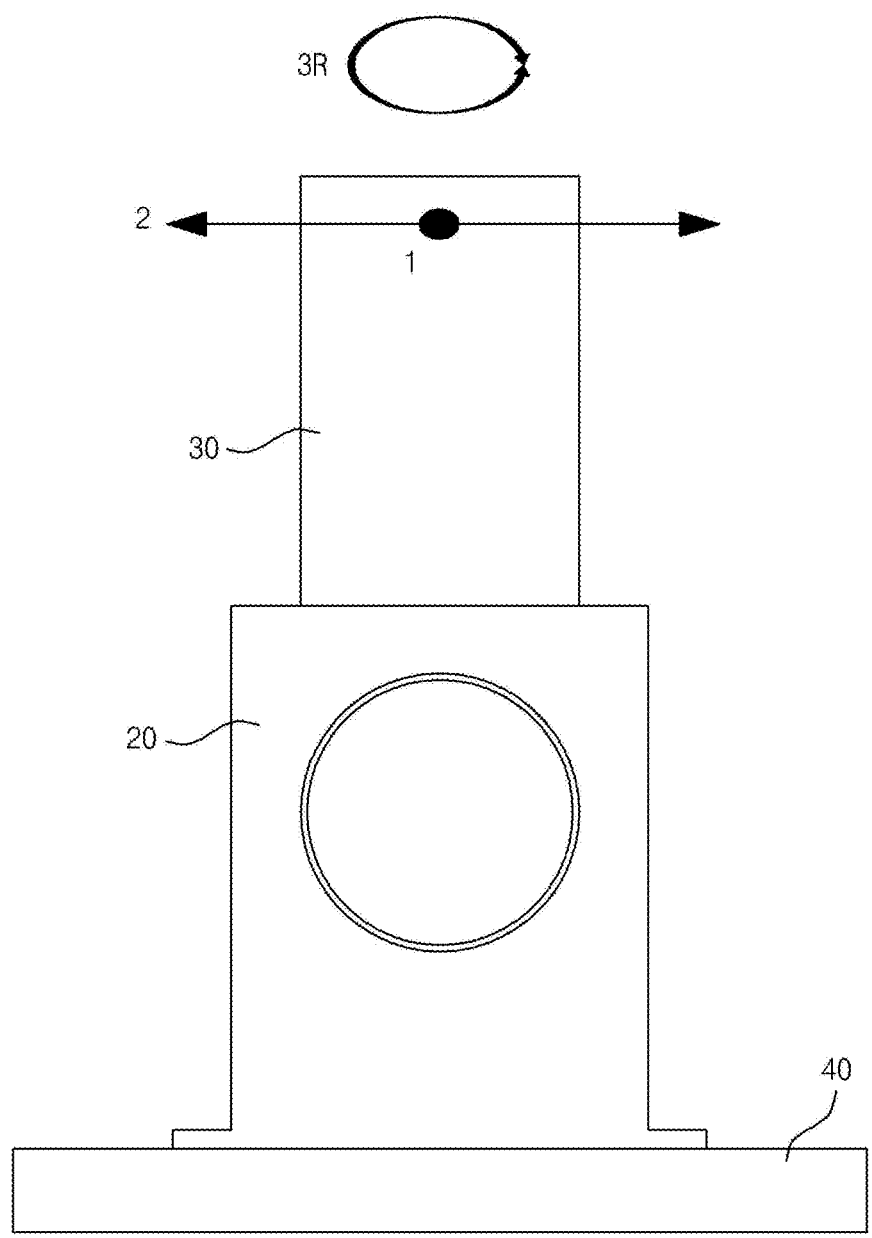

Next, as shown in FIG. 5, the optical element 10 is aligned using the optical alignment system 30; this is step (d). That is, the optical element 10 attached to the mount jig 20 is aligned using the 3-axis optical alignment system 30.

The optical power output is continuously checked with a measurement instrument while performing such alignment process. The 3-axis alignment process is performed to find a position where the optical power reaches its maximum value.

In this step, since the alignment of axis 1R had already been completed when the optical element 10 was attached to the mount jig 20 in step (a), there is an advantageous effect in that the alignment process for the axis 1R can be removed from the optical alignment system 30.

Figure 6:
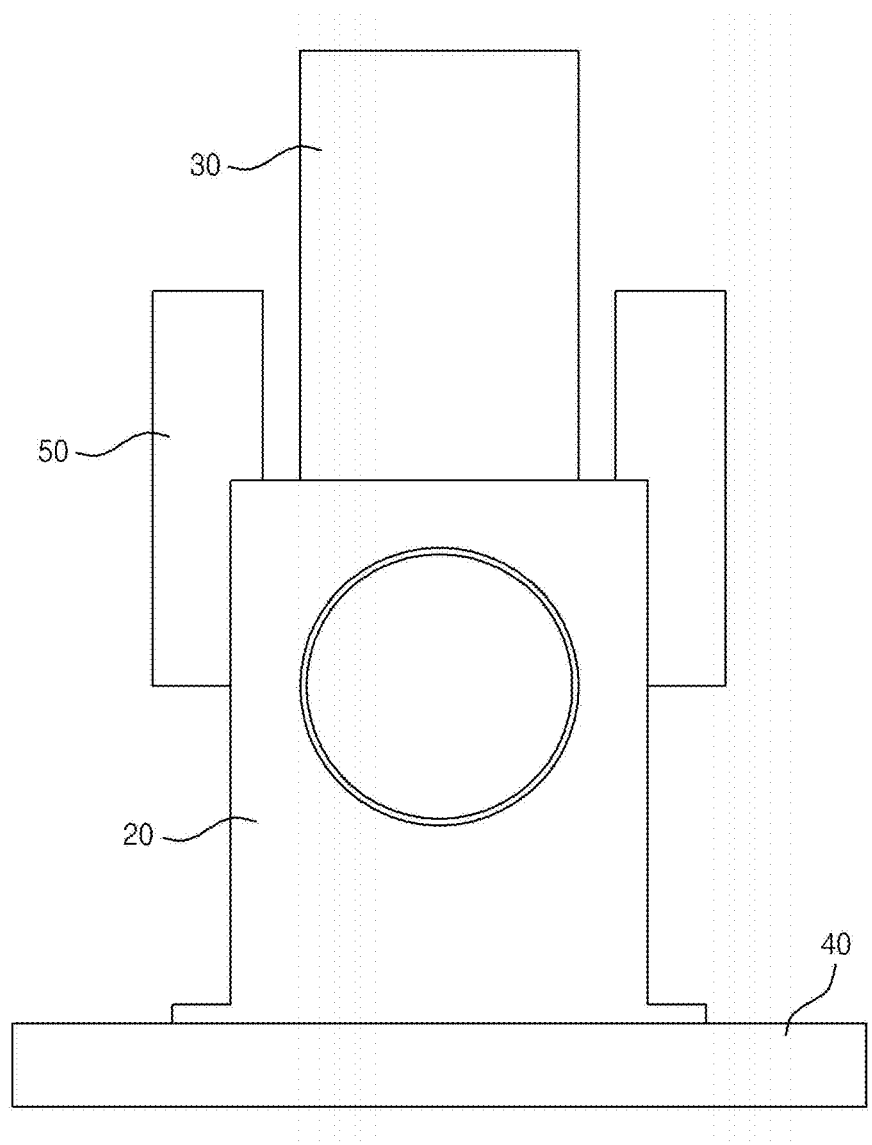

Next, as shown in FIG. 6, let the mount jig 20 and the base member 40 be forcibly in close contact with each other; this is step (e).

That is, in order to fix the mount jig 20, whose optical alignment had been completed, to the base member 40, the both sides of the mount jig 20 is pressed using a pressing jig 50 so that the mount jig 20 is closely in contact with the base member 40 thereby. In this way, the preparation step is completed for performing laser welding which is the next step. The pressing jig 50 can be configured to be capable of applying pressure or releasing the applied pressure by using a pneumatic jig.

Figure 7:
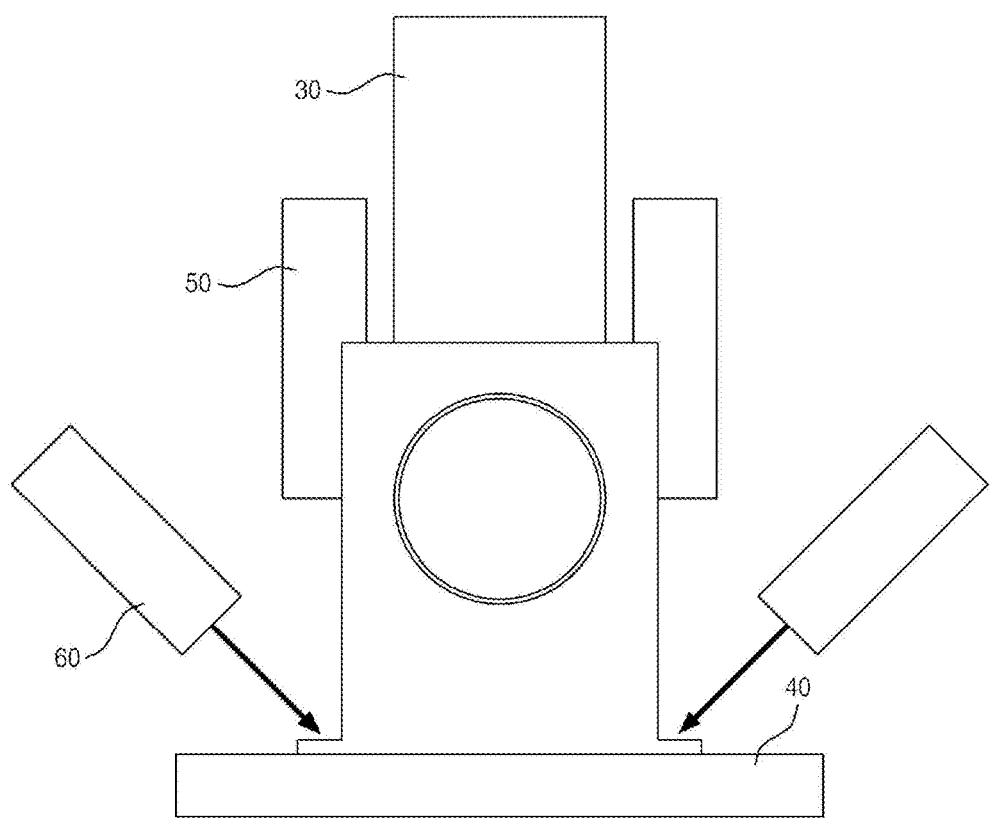

Next, as shown in FIG. 7, laser welding is performed to fix the mount jig 20 and the base member 40; this is step (f).

That is, laser welding is performed on the mount jig 20, which is already in close contact with the base member 40 by the pressing jig 50, by using a laser head module 60 for laser welding.

At this time, laser welding can be performed easily since a protruded edge 21 is formed in the lower end portion of the mount jig 20.

In this way, by performing laser welding, the mount jig 20 is coupled with the base member 40 through spot welding, and preferably, the work sequence of the laser welding process should be optimized in a way that the variation in the optically aligned power is minimized.

Figure 8:
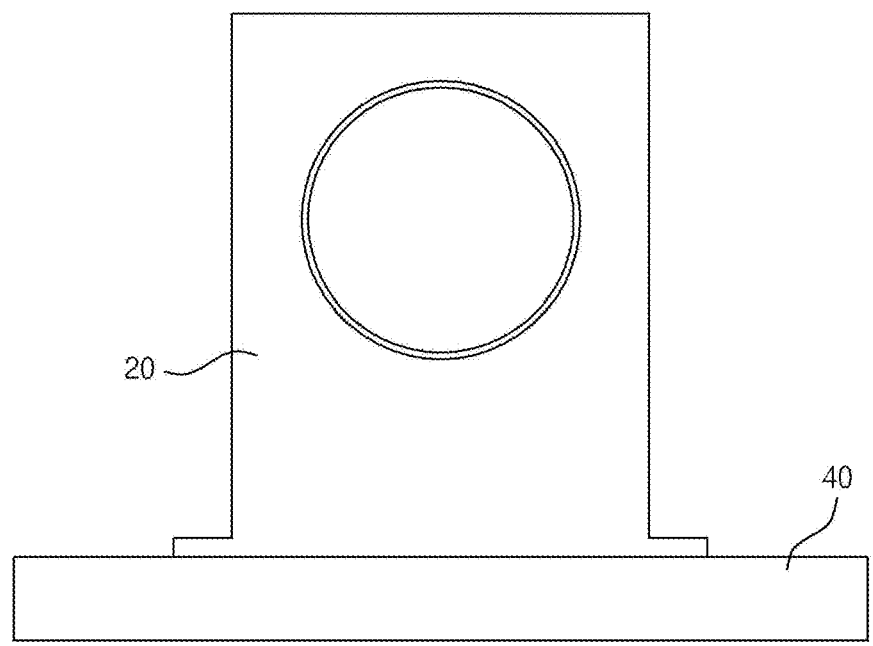

Finally, as shown in FIG. 8, the optical alignment system 30 is removed; this is step (g).

That is, when pneumatic jig is used as a pressing jig 50 in step (e) in order to make a close contact between the mount jig 20 and the base member 40, the pressing jig 50 is released from the mount jig 20 by applying a pneumatic pressure. In addition, when a pneumatic jig is used for the 3-axis alignment system 30 fixed to the mount jig 20, a pneumatic pressure is applied to release the fixing portion of the 3-axis alignment system 30, and thus, the 3-axis alignment system 30 is removed.

Meanwhile, a manufacturing method using 5-axis alignment is as follows:

5-axis alignment can be applied to an optical element 15 such as a resonator mirror.

Figure 9:
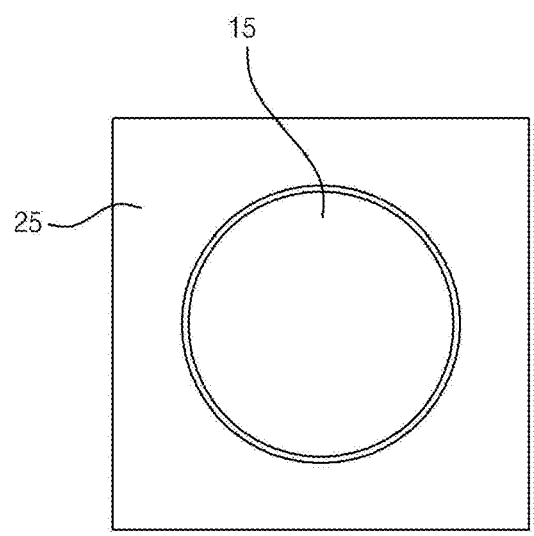
FIGS. 9 to 17 illustrate a method for manufacturing a laser module using 5-axis alignment according to a preferred exemplary embodiment of the present invention.

First, as shown in FIG. 9, the optical element 15 is attached to the mount jig 25; this is step (a).

In this exemplary embodiment, the mount jig 25 is not directly fixed to the base member 40, but instead fixed to the base member 40 by the welding jig 70, which will be described later, therefore, as for the shape of the mount jig 25, any shape capable of covering the optical element 15 is acceptable.

If the optical element 15 is a resonator mirror to be used for manufacturing 1064 nm product, generally it is manufactured using a glass material, and the one end surface of the optical element 15 is manufactured to have a reflective characteristic for 1064 nm wavelength, and the other end surface thereof is manufactured to have a non-reflective characteristic for 1064 nm wavelength. Since this is only an exemplary embodiment, different coating characteristics may be applied according to the changes in the requirement and the wavelength applied to the resonator.

The optical element 15 and the mount jig 25 can be fixed using a thermal curing or a UV curing epoxy.

Since the mount jig 25 is to be bonded to the base member 40 through laser welding, it is preferred to use a material having a low expansion coefficient, and any material that can be used for laser welding is acceptable. For example, various materials such as kovar, invar, stainless steel, aluminum (Al) or magnesium (MG) alloy, and the like can be applied.

Figure 10:
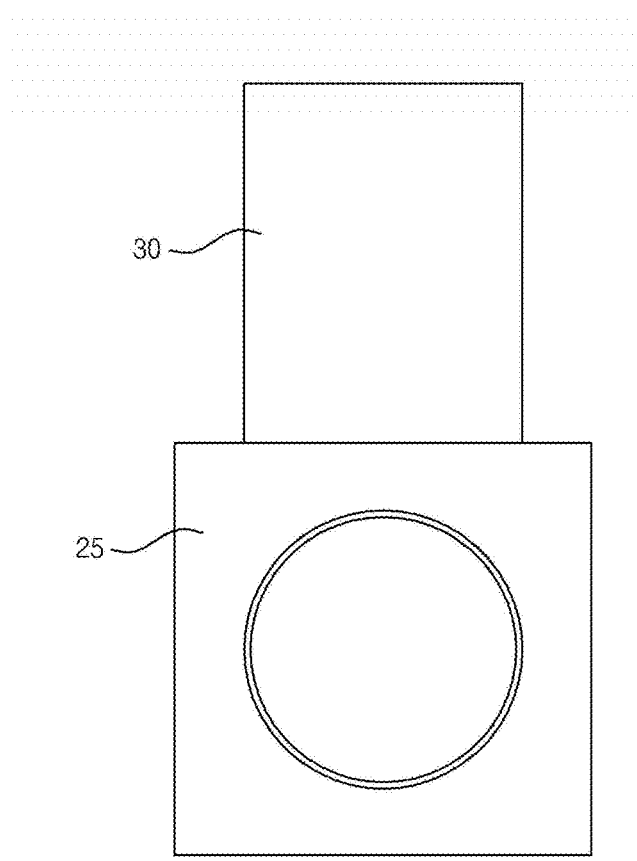

Next, as shown in FIG. 10, the mount jig 25 is fixed to the optical alignment system 30; this is step (b). That is, the optical alignment system 30 is fixed to the upper portion of the mount jig 25 using vacuum suction, pneumatic jig, screw coupling, and the like.

The alignment of the axis 1R had already been completed when the optical elements were attached to the mount jig in step (a), therefore, it is preferred that the optical alignment system 30 in step (b) is a 5-axis alignment system for aligning 5 axes of axis 1, axis 2, axis 3, axis 2R, and axis 3R. As described previously, the 5-axis alignment system of the present exemplary embodiment only uses axes to be used for aligning in a 5-axis alignment system and fixes the remaining axes, thus, of course, it can be used as a 3-axis alignment system as well.

Figure 11:
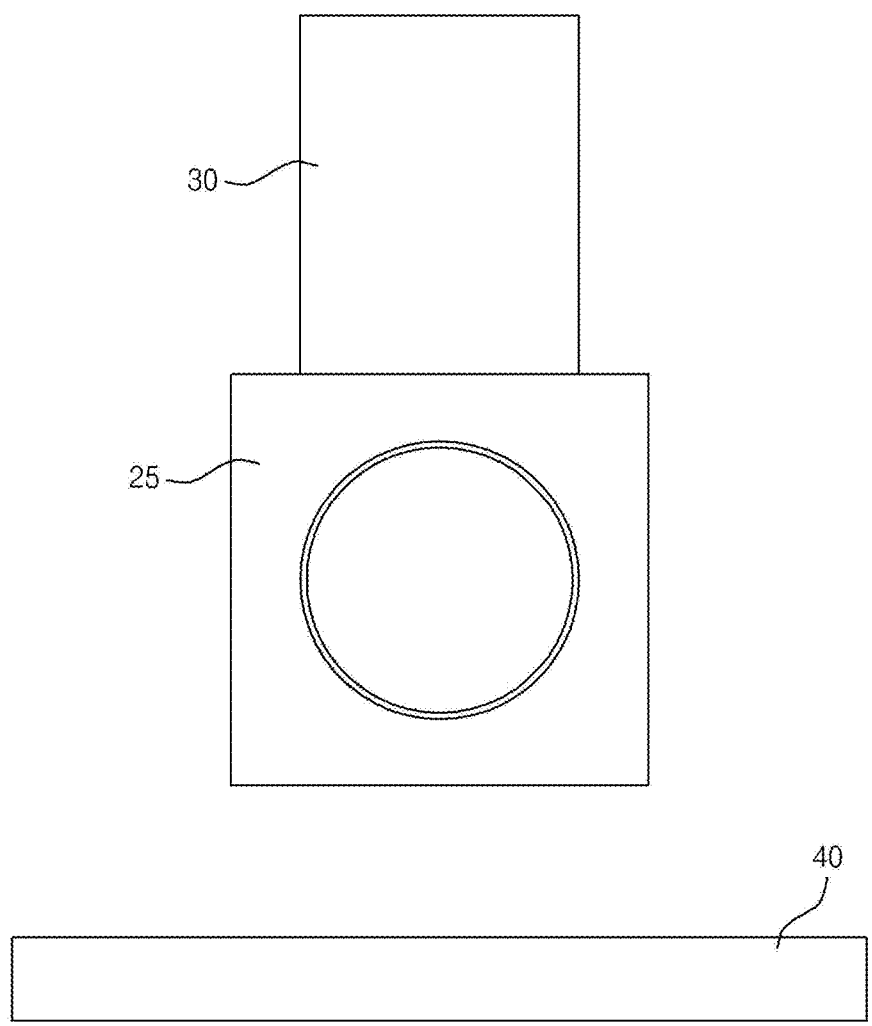

Next, as shown in FIG. 11, a mount jig 25 wherein an optical alignment system 30 is fixed is disposed in the upper side of the base member 40; this is step (c). That is, the mount jig 25 fixed with the optical alignment system 30 is moved to a specific location of the base member 40 of the laser module. In the present exemplary embodiment, the mount jig 25 is positioned so that it is spaced apart from the upper surface of the base member 40.

Figure 12:
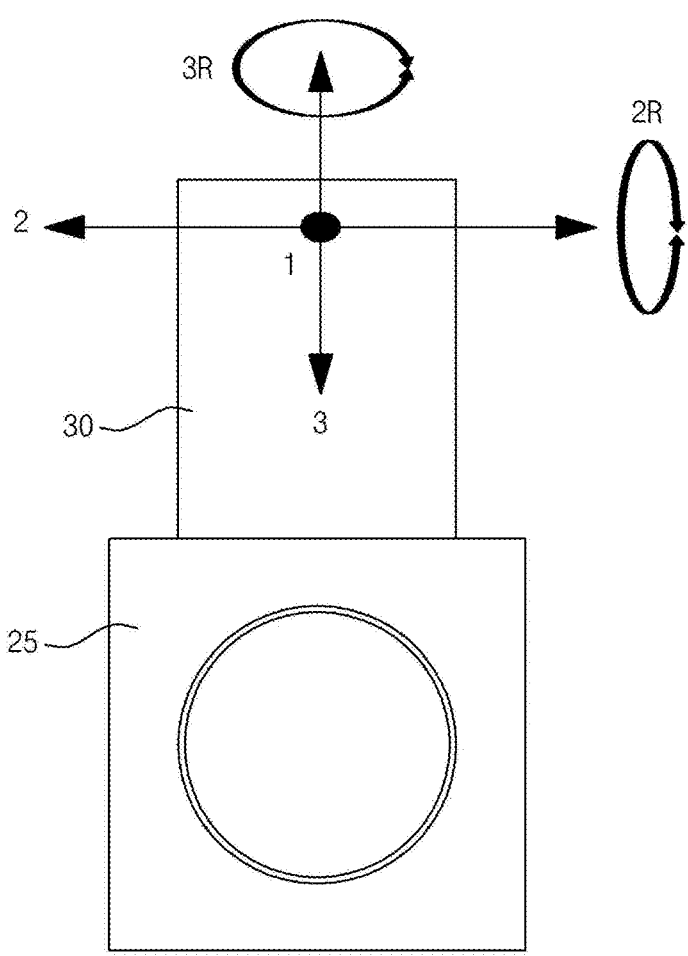

Next, as shown in FIG. 12, the optical element 15 is aligned using the optical alignment system 30; this is step (d). That is, the optical element 15 attached to the mount jig 25 is aligned using the 5-axis optical alignment system 30.

The optical power output is continuously checked with a measurement instrument while performing such alignment process. The 5-axis alignment process is performed to find a position where the optical power reaches its maximum value.

In this step, since the alignment of axis 1R had already been completed when the optical element 15 was attached to the mount jig 25 in step (a), there is an advantageous effect in that the alignment process for the axis 1R can be removed from the optical alignment system 30.

Figure 13:
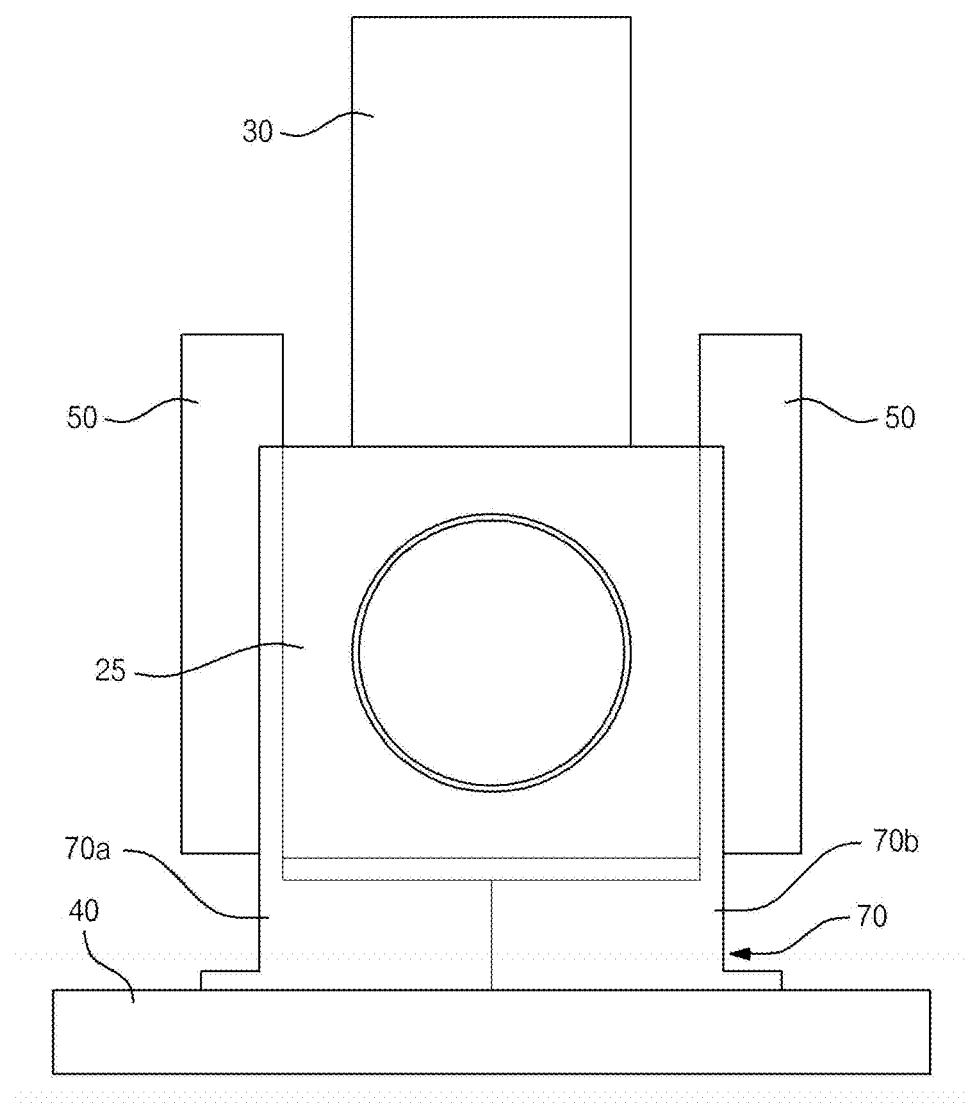

Next, as shown in FIG. 13, let the mount jig 25 and the base member 40 be forcibly in close contact with each other; this is step (e).

At this step, in 5-axis optical alignment, it is preferred that a welding jig 70 is disposed between the mount jig 25 and the base member 40.

Figure 14:
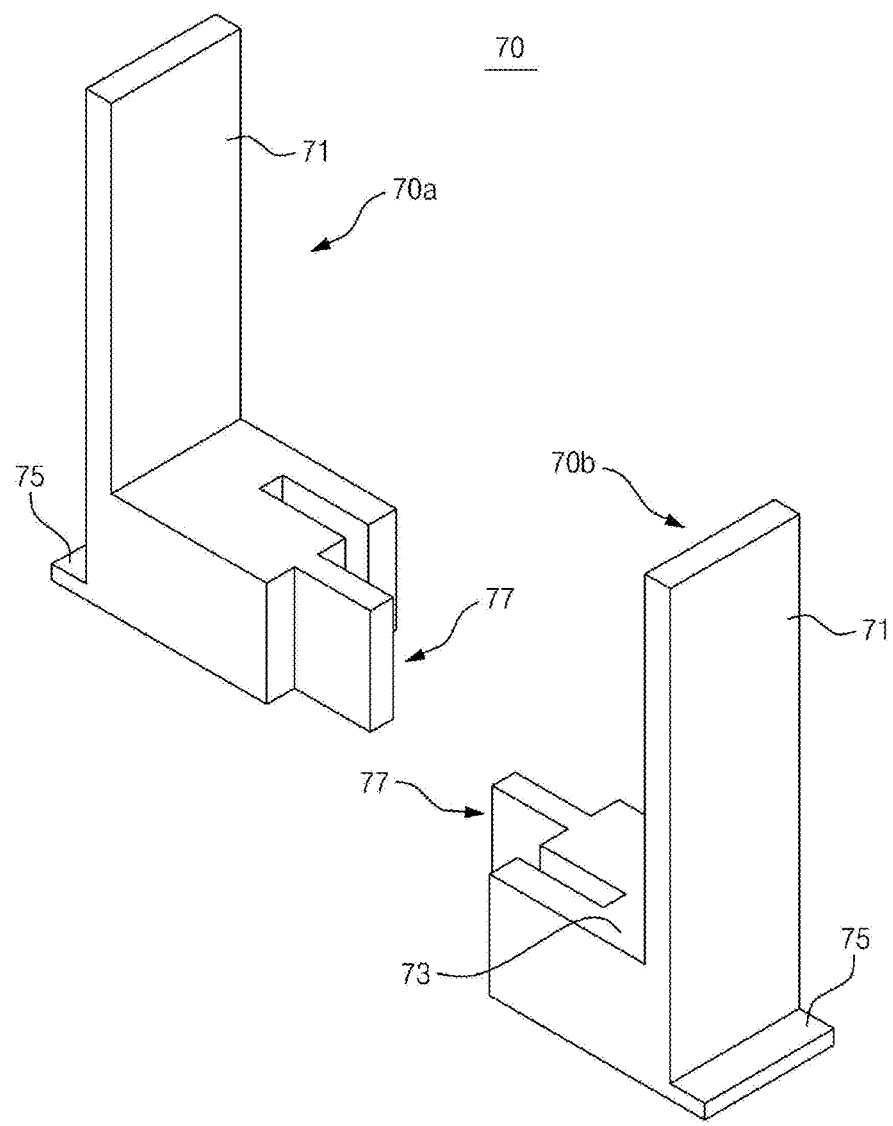

It is preferred that the welding jig 70 is configured in a way that the jig parts 70a and 70b, which are formed to have a same shape, are facing each other and forming a pair, and an exemplary example of the welding jig 70 is illustrated in FIG. 14.

As shown in FIG. 14, the welding jig 70 comprises two jig parts 70a and 70b disposed to face each other and coupled with each other, and each of the jig parts 70a and 70b comprises a sidewall portion 71, a bottom portion 73, a protruded edge 75, and a concave and convex portion 77.

The sidewall portion 71 is provided to cover the side surface of the mount jig 25, and the bottom portion 73 is provided to cover the lower side of the mount jig 25.

The protruded edge 75 is formed outwardly protruded in the lower end portion of the bottom portion 73, owing to this protruded edge 75, welding can be easily performed on the base member 40.

The concave and convex portion 77 is formed in the bottom portion 73, and is a portion to be coupled with the other jig part disposed facing each other.

Two of jig parts 70a and 70b configured in such way are coupled through the concave and convex portion 77, and the side surface and the bottom portion of the mount jig 25 are supported by the sidewall portion 71 and the bottom portion 73.

In this way, after disposing the welding jig 70 between the mount jig 25 and the base member 40, let the mount jig 25, the welding jig 70, and the base member 40 be forcibly in close contact with one another.

That is, the both sides of the mount jig 25 and the welding jig 70 are pressed using a pressing jig 50 so that the mount jig 25 and the welding jig 70 are closely in contact with each other, and the welding jig 70 and the base member 40 are closely in contact with each other. In this way, the preparation step is completed for performing laser welding which is the next step. The pressing jig 50 can be configured to be capable of applying pressure or releasing the applied pressure by using a pneumatic jig.

As previously described, a configuration wherein the welding jig 70 comprises two jig parts 70a and 70b is only an example, and instead, of course, it may be configured with a single jig part wherein the process tolerance is controlled within 100 µm or less. In this case, in order not to disturb the alignment position of the mount jig 25, a welding jig 70 comprising a single jig part is inserted and forcibly in contact therewith using the pressing jig 50, then the preparation step for performing laser welding is completed.

Figure 15:
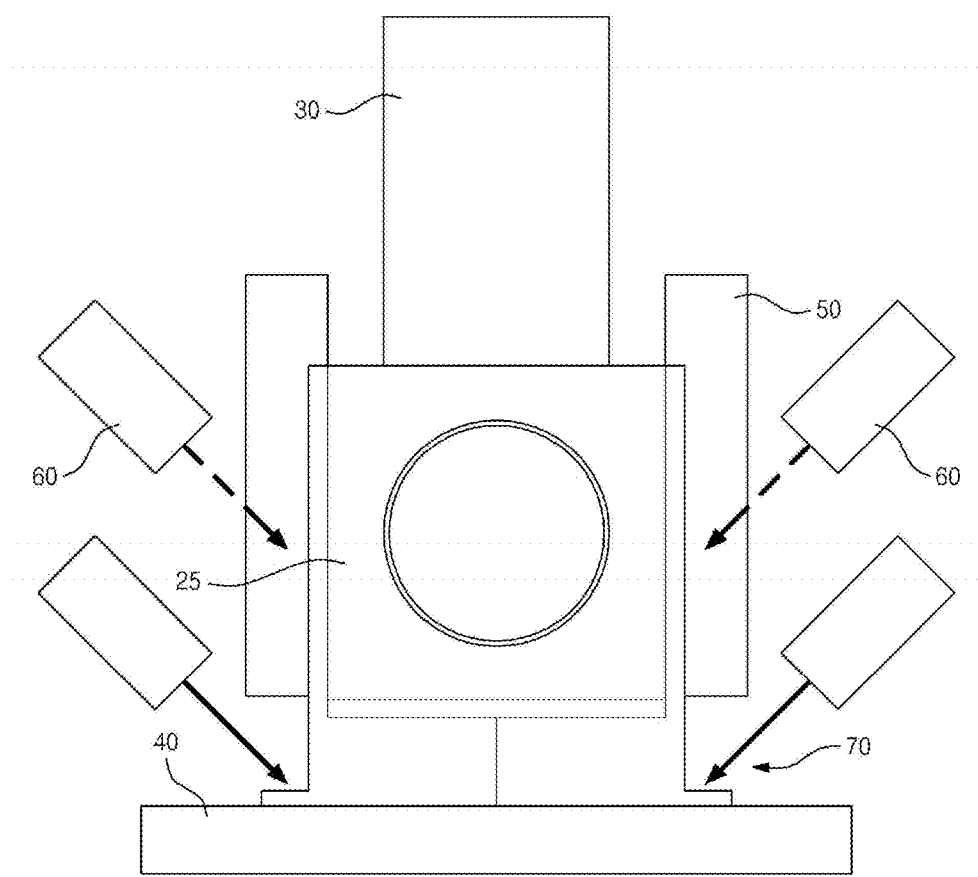

Next, as shown in FIG. 15, laser welding is performed to fix the mount jig 25 and the base member 40; this is step (f).

In this exemplary embodiment, since the welding jig 70 is disposed between the mount jig 25 and the base member 40 in step (e), it is preferred that laser welding is performed in a way that the welding jig 70 is fixed to the mount jig 25 and the base member 40.

That is, by performing laser welding on the welding jig 70, which is already in close contact therewith by the pressing jig 50, by using a laser head module 60 for laser welding, the welding jig 70 is coupled with the mount jig 25 and the base member 40 through spot welding. Preferably, the work sequence of the laser welding process should be optimized in a way that the variation in the optically aligned power is minimized.

A high power YAG pulse laser can be used as a laser to be used in the laser welding process.

Figure 16A:
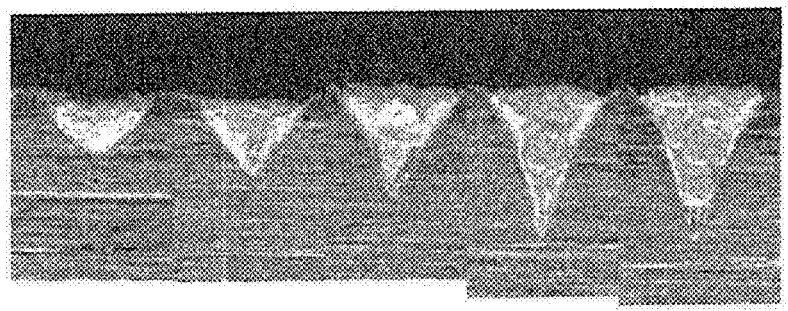

FIG. 16A is the result of analysis wherein the change in the penetration depth is analyzed using the cross-sections after performing laser welding on a stainless steel substrate with varying laser energy. It can be seen that the thickness between the components to be bonded through laser welding should be appropriately adjusted, and an optimization process for laser welding power is necessary.

Figure 16B:
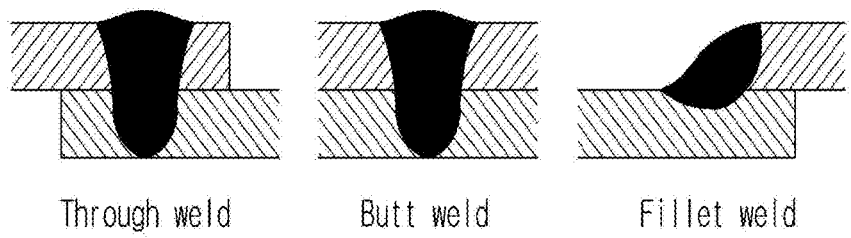

In addition, FIG. 16B illustrates various examples of the jointing structure that can be performed by laser welding. In addition to this, there are diverse jointing structures performed by laser welding.

In this way, various jointing structures of the welding jig 70 and the mount jig 25, and the welding jig 70 and the base member 40 can be applied in accordance with the corresponding exemplary embodiment.

Figure 17:
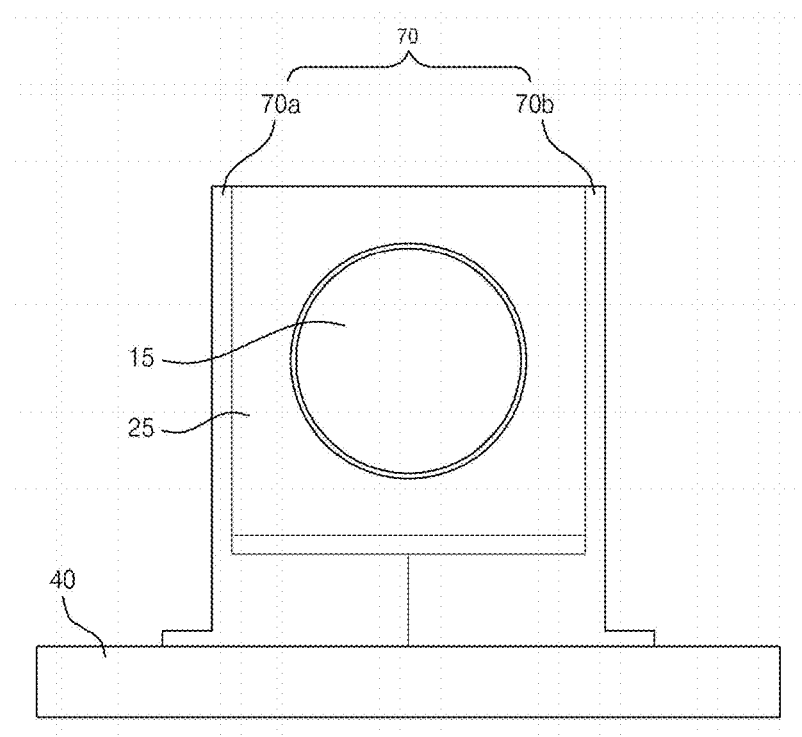

Finally, as shown in FIG. 17, the optical alignment system 30 is removed; this is step (g).

That is, when pneumatic jig is used as a pressing jig 50 in step (e) in order to make a close contact between the mount jig 25 and the base member 40, the pressing jig 50 is released from the mount jig 25 by applying a pneumatic pressure. In addition, when a pneumatic jig is used for the 5-axis alignment system 30 fixed to the mount jig 25, a pneumatic pressure is applied to release the fixing portion of the 5-axis alignment system 30, and thus, the 5-axis alignment system 30 is removed.

Hereinafter, a laser module package manufactured by applying the above described method for manufacturing a laser module will be described.

Figure 18:
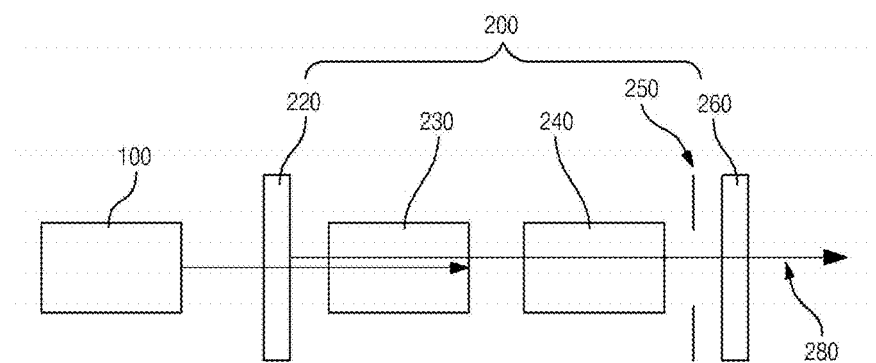
FIG. 18 illustrates a laser module package with an end pumping configuration according to a preferred exemplary embodiment of the present invention.

FIG. 18 is a drawing illustrating a laser module package using end pumping among the fundamental modules.

The pumping source 100 generates and output a pumping light, and may comprise a pumping diode, optical fibers, and a lens module for inputting light for the resonator. That is, it includes a lens module capable of focusing the light beam so that it enters towards the optical crystal 230 inside the resonator 200 with an appropriate beam size.

The resonator 200 is configured to include an optical crystal 230, a Q-switching device 240, and an aperture 250 between the input reflecting unit 220 and the output reflecting unit 260, and receives the light from the pumping source 100 and outputs the light with a maximized power. That is, the output power of the 1064 nm light source 280 can be maximized through performing optical alignment on the components of the resonator, and for this purpose, it is desirable to manufacture according to the following method.

The pumping source 100, the optical crystal 230, and the aperture 250 are fixed to the base member 40.

In addition, the input reflecting unit 220, the Q-switching device 240, and the output reflecting unit 260 can be manufactured for 5-axis alignment.

That is, the optical element 15 is attached to the mount jig 25, and then the mount jig 25 is fixed to the optical alignment system 30 and disposed in the upper side of the base member 40, and then they are aligned by using the optical alignment system 30, and the welding jig 70 is disposed between the mount jig 25 and the base member 40 so that they are forced to be in close contact with one another, and then the mount jig 25 and the welding jig 70, and the welding jig 70 and the base member 40 are fixed to each other respectively through the laser welding.

Especially, after fixing the pumping source 100, the optical crystal 230, and the aperture 250, the input reflecting unit 220 is aligned and the position thereof is fixed, and then the output reflecting unit 260 is aligned and the position thereof is fixed, and then the Q-switching device 240 is aligned and the position thereof is fixed, and thus, the manufacturing process of the laser module package is completed.

Although a laser module package using end pumping is illustrated in FIG. 18, but instead, of course, a laser module package using side pumping can be manufactured by rearranging the layout of the pumping source 100 for pumping the optical crystal 230.

In addition, the input reflecting unit 220 and the output reflecting unit 260 can be applied for the configuration of the resonator 200 in various ways in accordance with the corresponding exemplary embodiment. At this time, the stabilization of the resonator is necessary, and generally, it can be explained referring to FIG. 19.

Figure 19A:
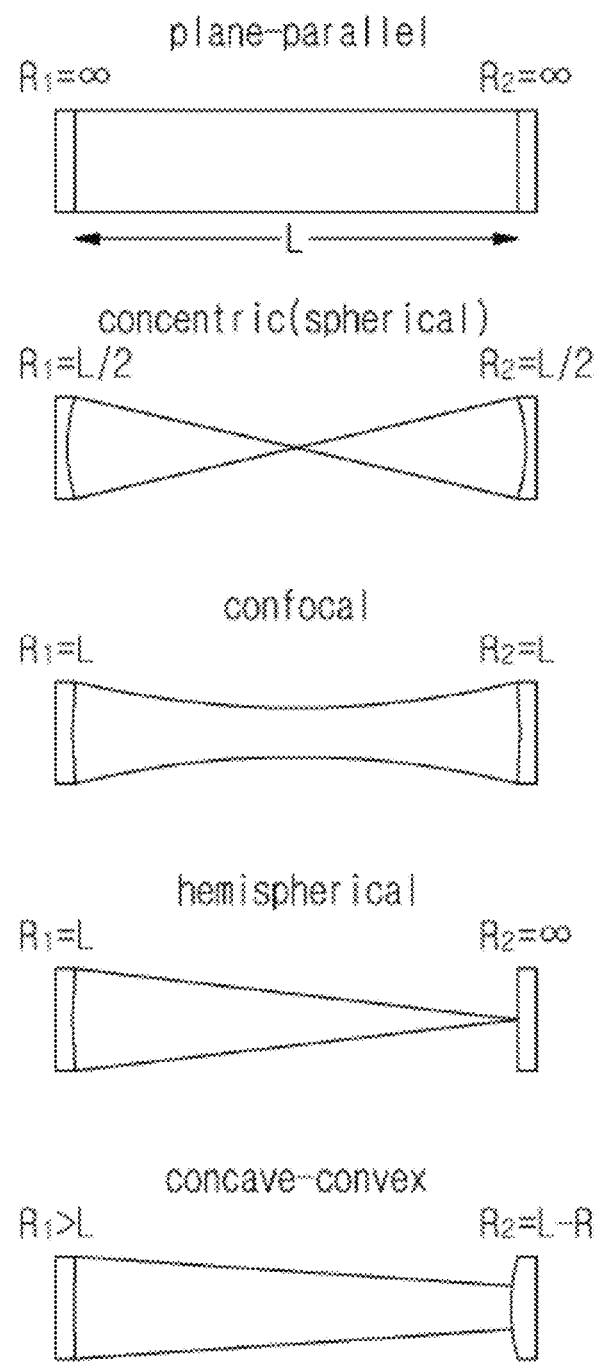
FIGS. 19A and 19B are a set of drawings for explaining the requirements for stabilizing the resonator.
Figure 19B:
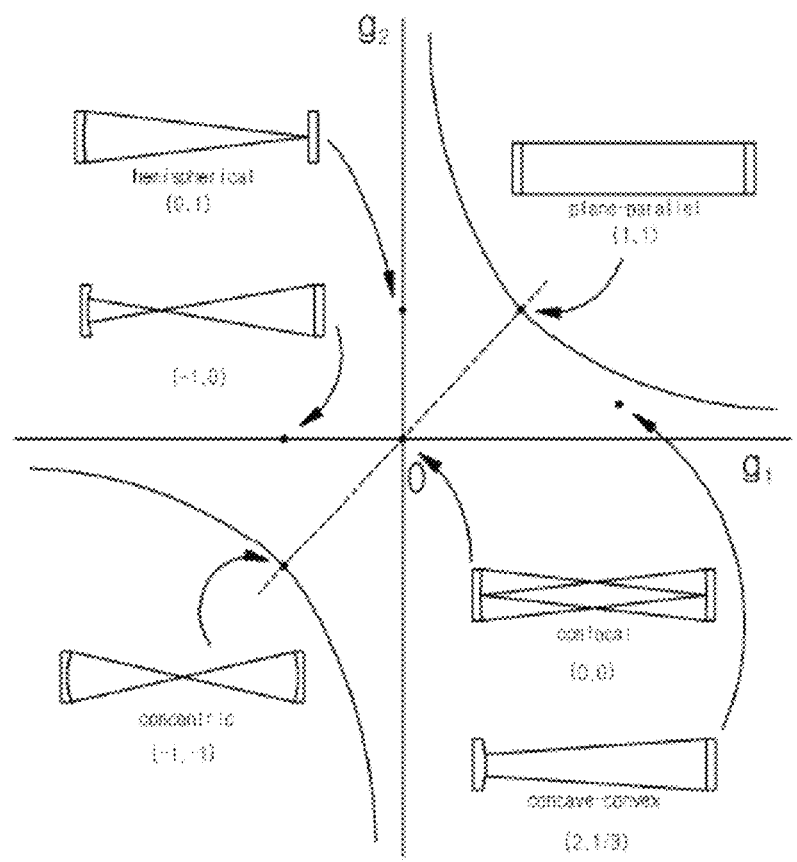
Figure 20:
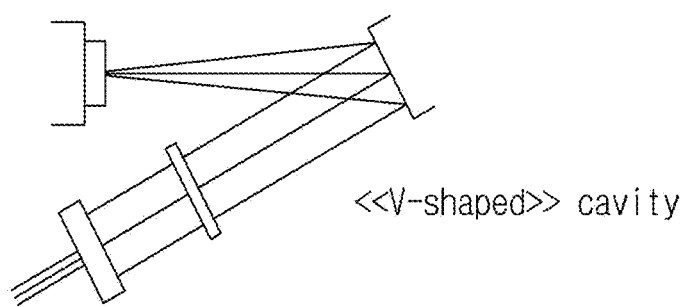
FIG. 20 illustrates a configuration of a 3-mirror resonator.
Figure 21A:
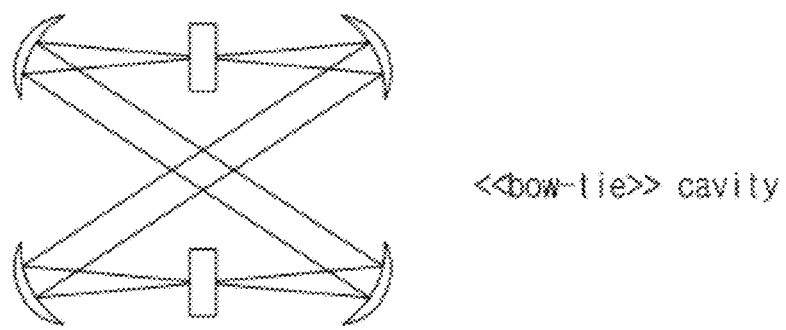
FIGS. 21A and 21B illustrate a configuration of a 4-mirror resonator.
Figure 21B:
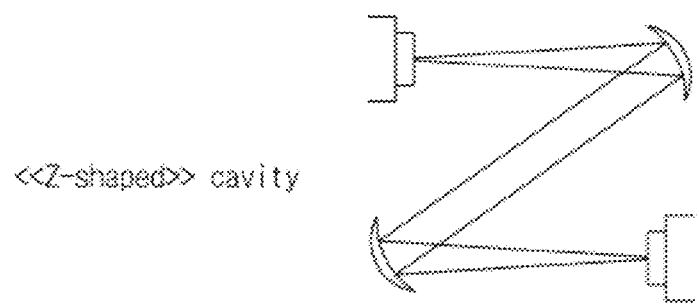

As illustrated in FIGS. 19A and 19B, various resonators suitable for its purpose can be configured by differently applying the radiuses of curvature R1 and R2 of the input reflecting unit 220 and the output reflecting unit 260, and the length L of the resonator. At this time, it is defined as g1=1−(L/R1) and g2=1−(L/R2), the necessary condition for stabilization is configuring the resonator so that the absolute value of the product of g1 and g2 becomes equal or less than 1. The manufacturing method for laser module suggested in the present invention is equally applied, however, only the optical specification of the input reflecting unit 220 and the output reflecting unit 260 of the resonator 200 is changed Further, the configuration of the resonator mirror can be differently applied in accordance with the number of the mirrors to be used. FIG. 20 illustrates a configuration of a 3-mirror resonator, and FIGS. 21A and 21B illustrate a configuration of a 4-mirror resonator. In this way, when a different number of the resonator mirror is applied, there is a change only in the highly reflecting mirror optical component other than the input reflecting unit 220 and the output reflecting unit 260, and the manufacturing method for a laser module suggested in the present invention is equally applied.

Meanwhile, the laser module can be configured to include a wavelength conversion crystal 324 for manufacturing lasers having various wavelengths, phosphor monopotassium ($KH_2PO_4$, KDP), lithium triborate ($L_iB_3O_5$, LBO), beta barium borate ($B_aB_2O_4$, BBO), and the like may be applied as a wavelength conversion crystal 324.

When such wavelength conversion crystal 324 is located inside a space formed between the input reflecting unit 220 and the output reflecting unit 260, it is called intracavity structure; on the contrary, when located outside the space formed between the input reflecting unit 220 and the output reflecting unit 260, it is called extracavity structure. The wavelength conversion crystal 324 requires temperature control and 5-axis optical alignment.

Figure 22:
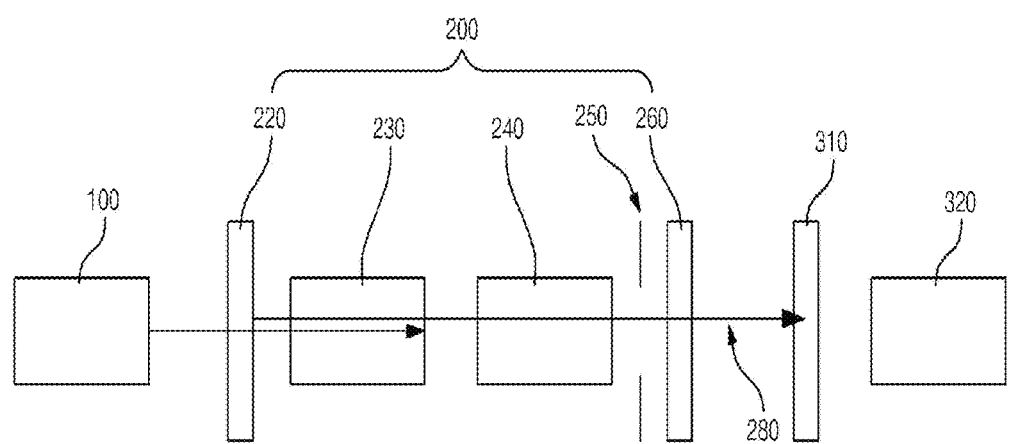
FIG. 22 illustrates a laser module package adopting an extracavity structure according to a preferred exemplary embodiment of the present invention.

FIG. 22 illustrates a laser module package having an extracavity structure wherein the wavelength conversion crystal 324 is located outside the space formed between the input reflecting unit 220 and the output reflecting unit 260

In the laser module package wherein an extracavity structure is applied, same symbol numbers are assigned for the parts having same structure and manufacturing method as those of the laser module package of the fundamental module that had been previously described, therefore the detailed description will be omitted, and only the parts having any difference will be described.

As illustrated in FIG. 22, an optical component 310 and a wavelength conversion component 320 are further included in the end of the laser module package of the fundamental module.

The optical component 310 receives and refracts the light outputted from the resonator 200.

The wavelength conversion component 320 converts the wavelength of the light outputted form the optical component 310.

Figure 23:
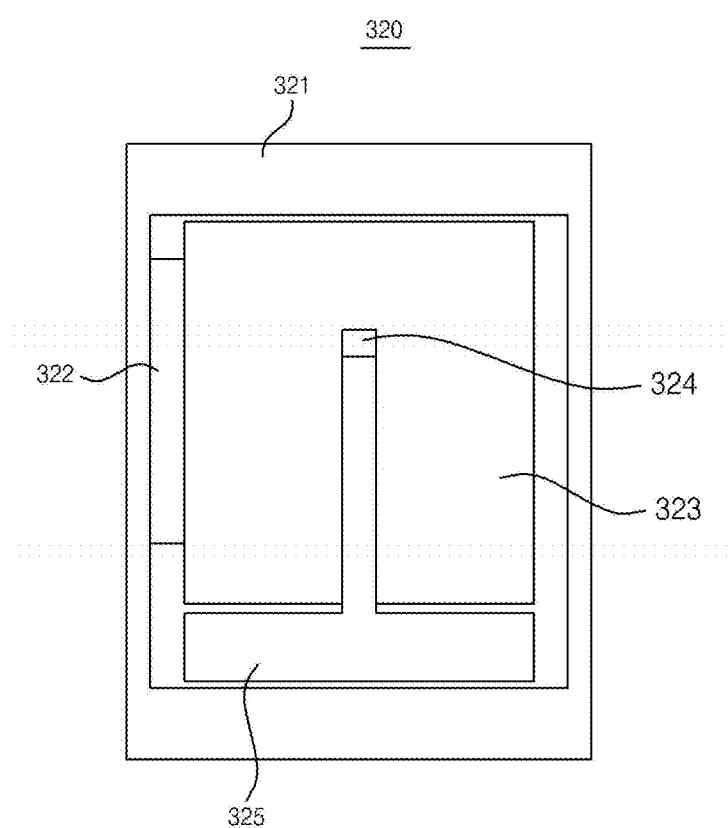
FIG. 23 illustrates a structure of the wavelength conversion crystal component in FIG. 22.

A structure of the wavelength conversion component 320 is illustrated in FIG. 23.

As illustrated in FIG. 23, a wavelength conversion crystal 324, a wavelength conversion crystal jig 323, a temperature control means 322, and a wavelength conversion mount jig 321 are included.

The wavelength conversion crystal jig 323 is provided to cover the wavelength conversion crystal 324, and fixes the wavelength conversion crystal 324. A temperature sensor is attached to the wavelength conversion crystal jig 323 for controlling the temperature.

The wavelength conversion crystal jig 323 where the wavelength conversion crystal 324 is fixed in such a way is fixed to the base 325.

A temperature control means 322 for controlling temperature is disposed in the one side of the wavelength conversion crystal jig 323. A thermal electric cooler (TEC) module or a heater module can be applied as the temperature control means 322, and in the present exemplary embodiment, the TEC module is applied as the temperature control means 322.

The wavelength conversion mount jig 321 is provided to cover the wavelength conversion crystal jig 323 and the temperature control means 322, and the wavelength conversion mount jig 321 is provided to be thermally insulated from the wavelength conversion crystal jig 323.

The wavelength conversion component 320 configured as described above can be manufactured using same manufacturing method for a 5-axis alignment type laser module which is previously described.

That is, the wavelength conversion component 320 is fixed to the optical alignment system 30 and disposed in the upper side of the wavelength conversion base member, and the wavelength conversion component 320 is aligned by using the optical alignment system 30, and a wavelength conversion welding jig is disposed between the wavelength conversion component 320 and the base member so that they are forced to be in close contact with each other, and then the wavelength conversion mount jig 321 and the wavelength conversion welding jig, and the wavelength conversion welding jig and the wavelength conversion base member are fixed to each other respectively through laser welding.

A mount jig structure wherein a TEC module is adopted as a temperature control means 322 is illustrated in FIG. 23 of the present specification, and when a heater module is adopted as a temperature control means, the mount jig 321 and the wavelength conversion crystal jig 323 are configured to be thermally insulated from each other, and a commonly used heater jig structure can be applied.

As for the laser module package wherein an extracavity structure illustrated in FIG. 22 is applied, an extracavity second harmonic generation (Extracavity SHG) is illustrated, and an extracavity third harmonic generation (Extracavity THG) can be configured by repeatedly applying an optical component 310 comprising lens and the wavelength conversion component 320 at the end portion of the wavelength conversion component 320 in FIG. 22.

As described above, according to a method for manufacturing a laser module, and the laser module package of the present invention, optimization of the optical components requiring precise alignment becomes possible, and an enhancement in the efficiency thereof can be expected.

In addition, the fixing method based on laser welding is faster, more precise, and has a higher reliability than the manual joining method.

Thus, unlike the method of the prior art wherein optical elements requiring multi-axes micro alignment are manually aligned one by one, and being fixed using a fixing means like screws, the present invention can obtain rapidity, accuracy and high reliability of the manufactured module by aligning precisely using an automated equipment, and fixing components through laser welding.

As describe above, although the present invention is described with limited exemplary embodiments and the drawings, the present invention is not limited to these, and of course, various changes and alterations of the present invention can be made by a person skilled in the art without departing from the spirit and the scope of the present invention written in the claims described herein below.

Description of Symbols 10, 15: optical element
30: optical alignment system
50: pressing jig
100: pumping source
220: input reflecting unit
240: Q-switching device
260: output reflecting unit
320: wavelength conversion crystal component
321: wavelength conversion mount jig
322: temperature control means
323: wavelength conversion crystal jig
324: wavelength conversion crystal
20, 25: mount jig
40: base member
70: welding jig
200: resonator
230: optical crystal
250: aperture
310: optical component

What is claimed is:

1. A method for manufacturing a laser module comprising the steps of:
   (a1) setting linear axes orthogonal to each other as axis 1, axis 2, and axis 3, wherein a direction of axis 1 is a direction of light propagation;
   (a2) setting rotation axes of the linear axes as axis 1R, axis 2R and axis 3R, respectively;
   (a3) attaching an optical element to a mount jig, wherein attaching the optical element to the mount jig completes an alignment of the axis 1R;
   (b) fixing said mount jig to an optical alignment system, wherein the optical alignment system is a 3-axis alignment configured to align axis 1, axis 2, and axis 3R;
   (c) arranging said mount jig fixed to said optical alignment system on an upper side of a base member;
   (d) aligning the optical element by using said optical alignment system;
   (e) letting said mount jig be in close contact with said base member;
   (f) performing laser welding so that said base member is fixed to said mount jig; and
   (g) removing said optical alignment system.

2. A method for manufacturing a laser module, the method comprises:
   (a1) setting linear axes orthogonal to each other as axis 1, axis 2, and axis 3, wherein a direction of axis 1 is a direction of light propagation;
   (a2) setting rotation axes of the linear axes as axis 1R, axis 2R and axis 3R, respectively;
   (a3) attaching an optical element to a mount jig, wherein attaching the optical element to the mount jig completes an alignment of the axis 1R;
   (b) fixing said mount jig to an optical alignment system, wherein the optical alignment system is a 5-axis alignment configured to align axis 1, axis 2, axis 3, axis 2R and axis 3R;
   (c) arranging said mount jig fixed to said optical alignment system on an upper side of a base member;
   (d) aligning the optical element by using said optical alignment system;
   (e) letting said mount jig be in close contact with said base member;
   (f) performing laser welding so that said base member is fixed to said mount jig; and
   (g) removing said optical alignment system.

3. The method for manufacturing a laser module according to claim 2, wherein in said step (e), a welding jig is disposed between said mount jig and said base member, and said mount jig, said welding jig, and said base member are forced to be in close contact with one another, and in said step (f), laser welding is performed in a way that said welding jig is fixed to said mount jig and said base member.

4. A laser module package comprising:
a pumping source for generating a pumping light and outputting thereof;
a resonator comprising an input reflecting unit, an optical crystal, a Q-switching device, an aperture, an output reflecting unit, for receiving the light from said pumping source and outputting the light with a maximized power;
an optical component for receiving and reflecting the light outputted from said resonator; and
a wavelength conversion crystal component for converting the wavelength of the light outputted from said optical component, wherein the wavelength conversion crystal component comprises:
a wavelength conversion crystal;
a wavelength conversion crystal jig configured to fix the wavelength conversion crystal;
a temperature control means on one side of the wavelength conversion crystal jig; and
a wavelength conversion mount jig configured to cover the wavelength conversion crystal jig and the temperature control means, and configured to be thermally insulated from the wavelength conversion crystal jig, wherein when the wavelength conversion crystal component is fixed to an optical alignment system and is in the upper side of a wavelength conversion base member:

the wavelength conversion crystal component is aligned by the optical alignment system,
a wavelength conversion welding jig is between the wavelength conversion crystal component and the wavelength conversion base member so that the wavelength conversion welding jig, the wavelength conversion crystal component, and the wavelength conversion base member are in close contact with each another, and
the wavelength conversion mount jig, the wavelength conversion welding jig, and the wavelength conversion base member are fixed to each other through laser welding,
wherein
said pumping source, said optical crystal, and said aperture are fixed to a base member,
said input reflecting unit, said Q-switching device, and said output reflecting unit are attached to a mount jig,
said mount jig is fixed to the optical alignment system and disposed in the upper side of said base member
the pumping source, the input reflecting unit, the optical crystal, the Q-switching device, the aperture, the output reflecting unit, the mount jig, and the base member are aligned by using said optical alignment system, and a welding jig is disposed between said mount jig and said base member so that they are forced to be in close contact with one another,
said mount jig and said welding jig, and said welding jig and said base member are fixed to each other respectively through laser welding.

* * * * *